United States Patent [19]
Dennison et al.

[11] Patent Number: 5,830,780
[45] Date of Patent: Nov. 3, 1998

[54] SELF-CLOSING VALVE STRUCTURE

[75] Inventors: Timothy Scott Dennison, Wappingers Falls, N.Y.; Michel Pozzo, Neuilly S/Seine, France

[73] Assignee: Sealed Air Corporation, Saddle Brook, N.J.

[21] Appl. No.: 756,811

[22] Filed: Nov. 26, 1996

[51] Int. Cl.⁶ .................................................... B32B 1/04
[52] U.S. Cl. ........................... 128/68; 137/843; 137/844; 137/846; 137/848; 137/850; 428/76; 446/220; 446/224
[58] Field of Search ........................ 428/68, 86; 137/848, 137/846, 850, 843, 844; 446/224, 220

[56] References Cited

U.S. PATENT DOCUMENTS

| | | | |
|---|---|---|---|
| 1,827,028 | 10/1931 | Malcom | 137/848 |
| 2,240,979 | 5/1941 | Byers | 137/848 |
| 4,674,532 | 6/1987 | Koyanagi | 137/512.5 |
| 4,708,167 | 11/1987 | Koyanagi | 137/512.5 |
| 4,850,912 | 7/1989 | Koyanagi | 441/41 |
| 4,917,646 | 4/1990 | Kieves | 446/224 |
| 4,966,197 | 10/1990 | Jaron et al. | 137/846 |
| 5,178,281 | 1/1993 | Enzu | 206/522 |
| 5,254,074 | 10/1993 | Landers et al. | 493/213 |

FOREIGN PATENT DOCUMENTS

| | | |
|---|---|---|
| 1371743 | 7/1964 | France . |
| 9201122 | 8/1997 | Spain . |
| 1066427 | 4/1967 | United Kingdom . |
| WO96/22926 | 8/1996 | WIPO . |

*Primary Examiner*—Nasser Ahmad
*Attorney, Agent, or Firm*—Bell Seltzer Intellectual Property Group of Alston & Bird LLP

[57] ABSTRACT

There is provided a self-sealing valve structure. The structure has a first sheet of thermoplastic material and a second sheet of thermoplastic material in face-to-face relationship with each other and are secured together along a portion of the longitudinal edges of the sheets and define a passageway therebetween. In one embodiment, the passageway has an air inlet end and an air outlet end. The air outlet end has at least a pair of air outlets located at each of the longitudinal edges of the valve and directing the incoming air through each of the longitudinal edges near the outlet end of said valve. The air outlets are formed by an air deflector blocking the end of the outlet which is preferably of a U-shape or a V-shape. In another embodiment, the passageway directs air through only one longitudinal edge of the valve. The invention also provides for an inflatable packaging cushion which includes a pair of air impermeable flexible walls welded together at their edge, and a self-closing valve of the type described.

5 Claims, 3 Drawing Sheets

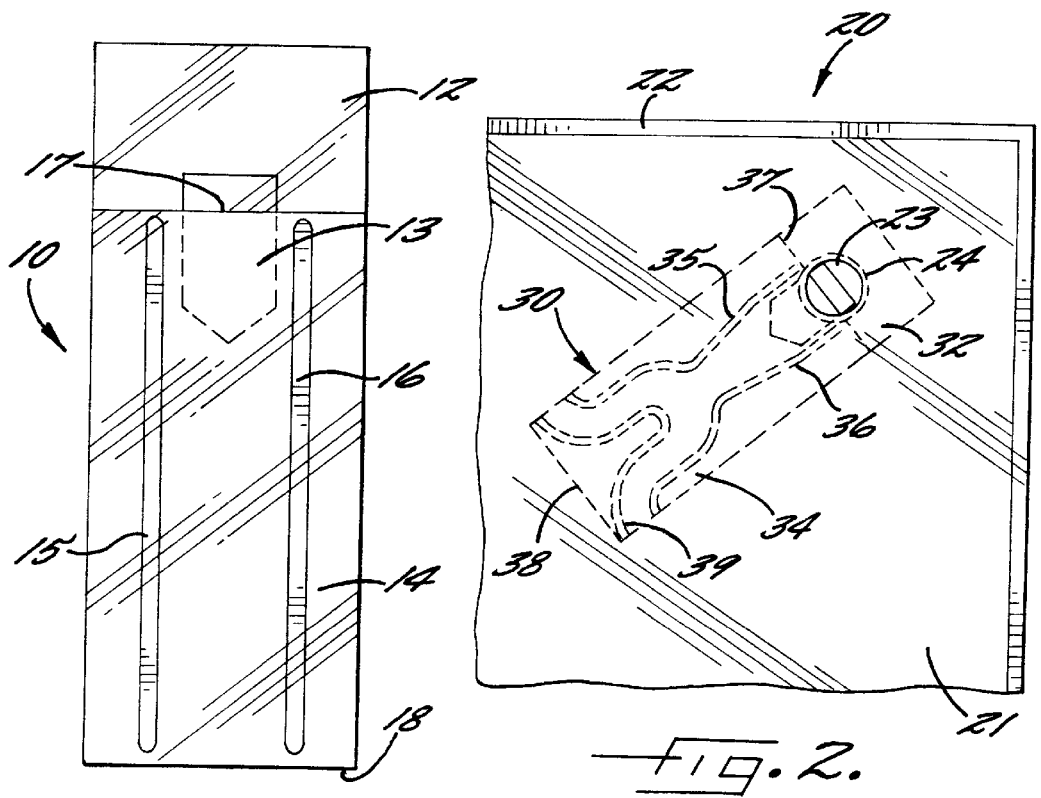
Fig. 1.
PRIOR ART
Fig. 2.
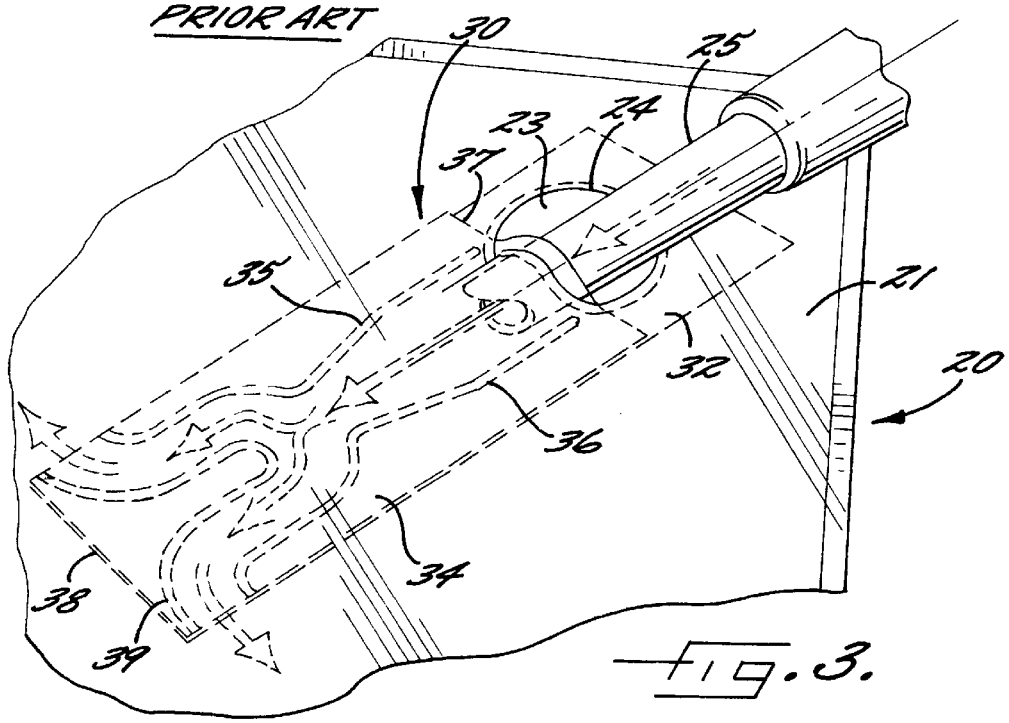
Fig. 3.

SELF-CLOSING VALVE STRUCTURE

BACKGROUND OF THE INVENTION

The present invention relates generally to self-closing valve structures. More particularly, the present invention relates to self-closing valves having an improved outlet design for dispersion of air into inflatable packaging materials.

It has been long known that inflatable packaging material can be used to protect articles of different shapes and sizes during shipping. There are numerous types and forms of packaging material for this purpose. Typically, inflatable packaging material is made from thermoplastic sheets which have been hermetically sealed around their periphery for retaining a fluid, such as air. These inflatable cushions are typically inflated through a self-closing valve. An example of such inflatable packaging material is shown in U.S. Pat. No. 5,348,157 to Pozzo.

One example of a self-closing valve is shown in U.S. Pat. No. 4,917,646 to Kieves which discloses a self-closing valve of thermoplastic material defining a passageway between a valve inlet and a valve outlet in which the valve passageway includes an offset section resulting in the air passageway having reduced capacity. Another example of a self-closing valve is shown in PCT Published Application No. WO 96/22926 wherein there is shown an inflatable cushion having an inflation valve affixed to an internal face of one of the flexible walls of the cushion. Also in Spanish Utility Model NO. U9201122Y there is disclosed a self-closing inflation valve structure having staggered weld lines which extend from the longitudinal sides at a slant toward the internal end of the valve causing the inlet air to change the direction of inward flow from one side of the valve to the other and back again.

A further example of a one-way valve is shown in U.S. Pat. No. 4,966,197 to Jaron, et al., which is directed to a one-way valve comprising two flat resilient members in face-to-face relationship and bonded along generally parallel tracks defining a passageway therebetween. The passageway defined in the Jaron patent has a tortuous profile along the inner edges of the passageway preventing fluid from exiting. In one embodiment of the Jaron patent, there is shown a valve having a single inlet and divided so as to divide the incoming fluid stream with each of the divided streams exiting through the outlet end of the valve.

In each of the self-closing valves of the prior art, the incoming air is directed through the valve passageway and into the inflatable cushion through the end portion of the outlet end, which produces stress on the valve structure resulting in leakage from back pressure of the air. The self-closing valve structures of the present invention provide a valve having reduced stress on the structure and provide a seal having less air leakage than those of the prior art.

SUMMARY OF THE INVENTION

Therefore, it is an object of the present invention to provide a self-closing valve structure for inflatable packaging material.

Another object of the present invention is to provide a self-closing valve structure which can be used in inflatable packaging material in which the inlet air is caused to disperse into the cushion chamber through at least one of the sidewalls of the self-closing valve.

It has been found that the foregoing objects are accomplished in accordance with this invention by providing a self-sealing valve for inflating a packaging cushion.

There is provided a self-closing valve structure comprising a first sheet of thermoplastic material and a second sheet of thermoplastic material in face-to-face relationship with each other. The sheets of thermoplastic material are secured together along a portion of their longitudinal edges such that the sheets define a passageway therebetween. The passageway is further defined by an air inlet end and an air outlet end. The longitudinal edges are secured through the portion of the edges nearest the air inlet end with the remainder toward the air outlet end being opened at each longitudinal edge. At the air outlet end of the structure is an air deflector blocking the air outlet end and dividing and directing the incoming air through each of the longitudinal edges near the air outlet end of the valve. The air deflector is in the form of a seam formed by heat sealing, ultrasonics or the like. The air passageway may take a variety of forms and shapes such as a generally U-shape or V-shape extending across the valve outlet end. The shape of the air deflector is such that the incoming air is directed in non-linear flow through the longitudinal edges of the valve passageway.

In another preferred embodiment of the invention there is provided a self-closing valve structure wherein the valve is formed from two thermoplastic sheets secured together along a portion of their longitudinal edges forming a passageway for non-linear air flow through the valve and passing out of the valve through one of the longitudinal edges.

In another aspect, the invention further provides for an inflatable packaging cushion of air impermeable material which includes the self-closing valves of the present invention.

BRIEF DESCRIPTION OF THE DRAWINGS

Other objects, features and advantages of the invention will become apparent from the following detailed description of the invention when taken in conjunction with the accompanying drawings, in which:

FIG. 1 is a plan view of a self-closing valve structure known in the prior art;

FIG. 2 is a partial plan view showing the self-closing valve structure of the present invention in an inflatable cushion;

FIG. 3 shows an isometric view of the inflatable cushion of FIG. 2 being filled with air through the self-closing valve of the present invention;

DETAILED DESCRIPTION OF THE INVENTION

Figure 4:
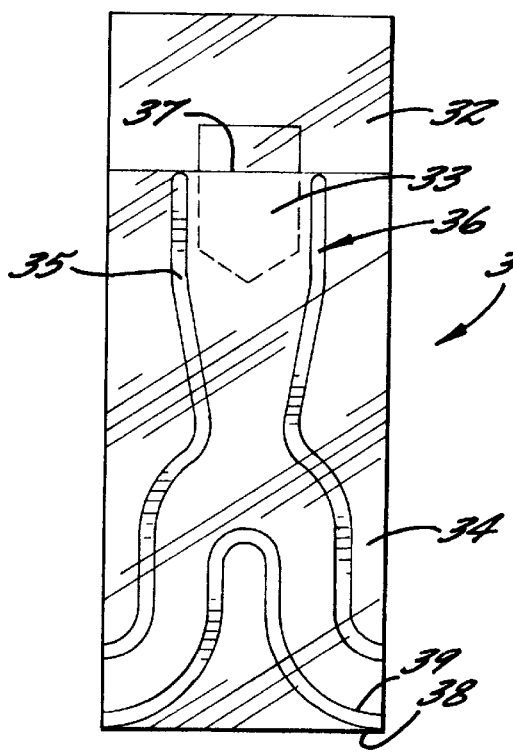
FIG. 4 shows a first embodiment of the self-closing valve of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to the drawings and, in particular, to FIG. 1, there is shown a self-closing valve of the prior art designated generally by the reference 10, being secured on its longitudinal sides and having an inlet end and an outlet end through which air enters into an inflatable cushion. The self-closing valve includes a first sheet of thermoplastic material 12 and a second sheet of thermoplastic material 14 in face-to-face relationship with each other. The first and second sheets 12, 14 are secured together at weld lines 15, 16 along the longitudinal sides of the sheets and define a passageway therebetween. The passageway is further defined by an air inlet end 17 and an air outlet end 18. A non-sealing barrier 13 is provided at the air inlet end.

There is shown in FIGS. 2 and 3 an inflatable cushion 20 used for protecting an article during shipping and storage. The inflatable cushion 20 includes a self-closing valve of the present invention. The inflatable cushion 20 is made of two sheets or walls 21 of air impervious thermoplastic material. Any number of well-known commercially available air impervious thermoplastic materials may be used to form the cushions. The sheets 21 are juxtaposed over each other and sealed together in the region of their peripheral edges along a weld line 22 defining the cushion air retaining chamber. The weld line 22 may be formed by conventional techniques, for example heat sealing, ultrasonic sealing or the like. The inflatable cushion shown in FIG. 2 includes an inflation valve 30 of the type shown in FIG. 4.

Referring now to FIG. 4, there is shown a preferred embodiment of the self-closing valve of the present invention and which is designated generally by the reference 30. The self-sealing valve includes a first sheet of thermoplastic material 32 and a second sheet of thermoplastic material 34 in face-to-face relationship with each other. The thermoplastic sheets 32, 34 may be any of well-known commercially available materials used for that purpose. The sheets forming the valve may be of the same thickness or of different thickness. The first sheet 32 or back sheet as shown in FIG. 4, is longer than the front or second sheet 34 so that the valve structure may be welded to a wall portion rather than at an edge and so that the inflating nozzle may be easily inserted. The first and second sheets 32, 34 are secured together at weld lines 35, 36 along a portion of the longitudinal edges of the sheets and define a passageway therebetween. The weld lines forming the passageway extend along the longitudinal edges from the air inlet end to near the air outlet end. A sufficient unwelded space along the longitudinal edge is provided for the incoming air to pass therethrough. In the embodiment of FIG. 4, the welds 35, 36 along the longitudinal edges taper slightly inwardly for a portion of their length somewhat narrowing the passageway width causing non-linear air flow. The thus-formed self-closing valve includes an air inlet end 37 and an air outlet end 38. At the air outlet end 38 there is provided an air deflector, shown as weld line 39, blocking the air outlet end. The spaces between the ends of air deflector 39 and weld lines 35, 36 form air outlets directing the incoming air into the cushion chamber. The air deflector 39 is shaped to divide the incoming air and direct the air through each longitudinal edge of said valve. A non-sealing barrier 33 may be provided at the air inlet end to prevent welding the valve shut when sealing the valve to a cushion wall.

As shown in FIG. 3, the inflation selfclosing valve 30 is affixed to the internal face of flexible cushion wall, sheet 21, at a predetermined distance from the peripheral edge, weld line 22, of the cushion. The valve opens to the exterior of the cushion through an aperture 23 which is provided in flexible wall 21, to which valve 31 is affixed. The weld line 24 affixing inflation valve 30 to the cushion wall 21 describes a circle or other shape capable of surrounding the aperture 23 that is provided in flexible wall 21. The cushion is inflated by inserting nozzle 25 through aperture 23 and into the passageway. Because the nozzle 25 cannot extend through the passageway into the interior of the cushion, there is no back leakage of air. It should be understood, however, that the self-closing valve may be affixed to the cushion walls 21 at their peripheral edge, weld line 22.

Figure 5:
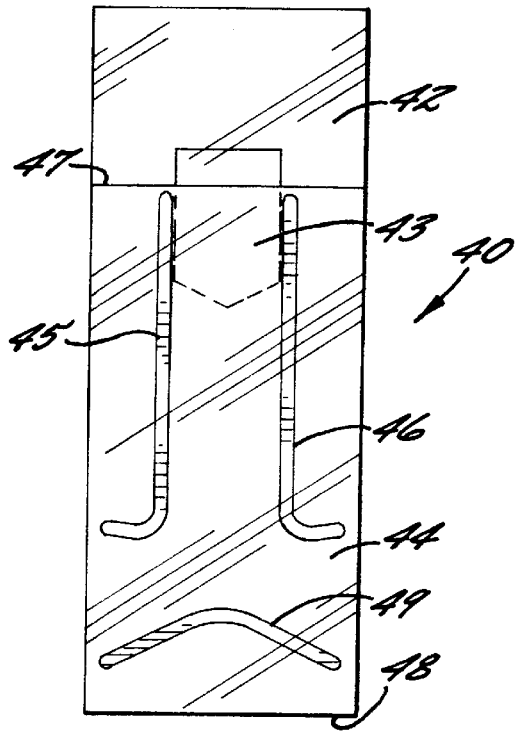
FIG. 5 shows a second embodiment of the self-closing valve of the present invention.

An alternative embodiment is shown in FIG. 5 wherein there is provided a self-closing valve 40 of the present invention which includes a first sheet of thermoplastic material 42 and a second sheet of thermoplastic material 44 in face-to-face relationship with each other. Sheet 42 is longer than sheet 44 so that the valve structure may be welded to a wall portion rather than at an edge. Sheets 42, 44 are secured together at weld lines 45, 46 along a portion of the longitudinal edges of the sheets and define a passageway therebetween. The weld lines forming the passageway extend along the longitudinal edges from an air inlet end 47 to near the air outlet end 48 where they terminate in outwardly hooking ends. A sufficient unwelded space along the longitudinal edge is provided for the incoming air to pass therethrough. At the air outlet end 48 there is provided a generally V-shaped air deflector, shown as weld line 49, blocking the air outlet end. The spaces between the ends of air deflector 49 and weld lines 45, 46 form air outlets directing the incoming air into the cushion chamber. The V-shape of air deflector 49 divides the incoming air and directs the air through each longitudinal edge of said valve. A non-sealing barrier 43 may be provided at the air inlet end.

Figure 6:
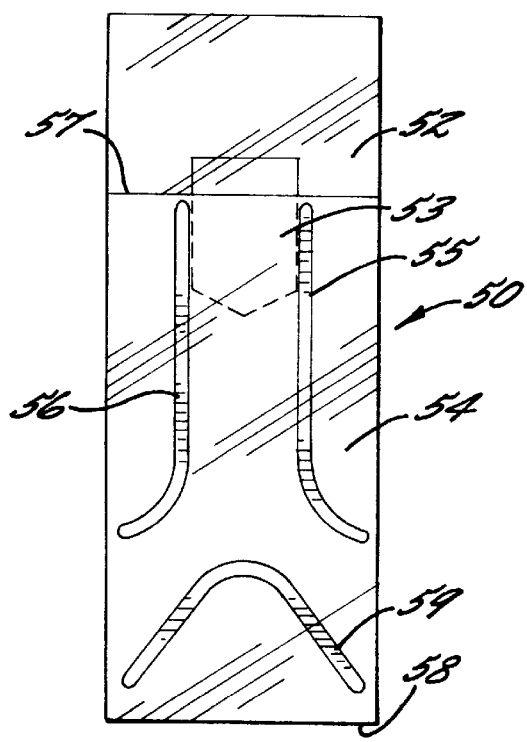
FIG. 6 shows a third embodiment of the self-closing valve of the present invention.

Yet another embodiment of the self-closing valve of the present invention is shown in FIG. 6 wherein there is provided valve 50 of the present invention which includes first and second sheets 52, 54 of thermoplastic material in face-to-face relationship with each other. Sheet 52 is longer than sheet 54 so that the valve structure may be welded to a wall portion rather than at an edge. The sheets are secured together at weld lines 55, 56 along a portion of their longitudinal edges and define a passageway therebetween. The weld lines forming the passageway extend along the longitudinal edges from an air inlet end 57 to near the air outlet end 58 where they terminate in outwardly extending ends. A sufficient unwelded space along the longitudinal edge is provided for the incoming air to pass therethrough. At the air outlet end 58 there is provided a generally U-shaped air deflector, shown as weld line 59, blocking the air outlet end. The spaces between the ends of air deflector 59 and weld lines 55, 56 form air outlets directing the incoming air into the cushion chamber. The U-shape of air deflector 59 divides the incoming air and directs the air through each longitudinal edge of said valve. A non-sealing barrier 53 may be provided at the air inlet end.

Figure 7:
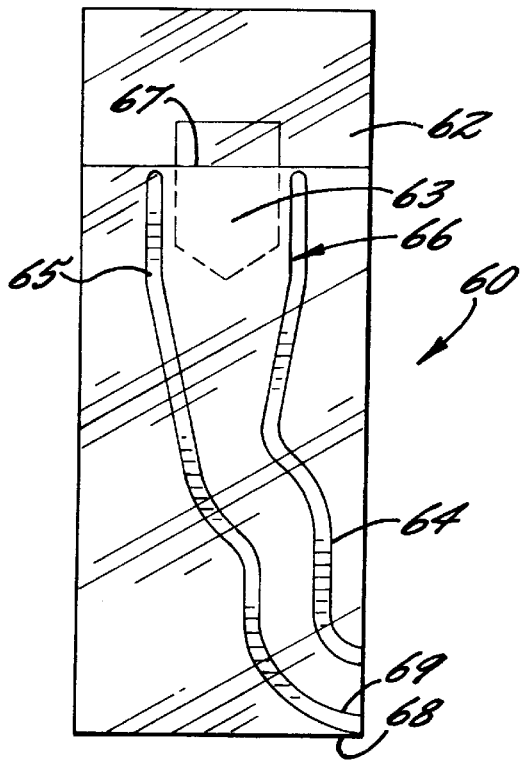
FIG. 7 shows an embodiment of the self-closing valve of the present invention having air flow directed through one side of the valve.
Figure 8:
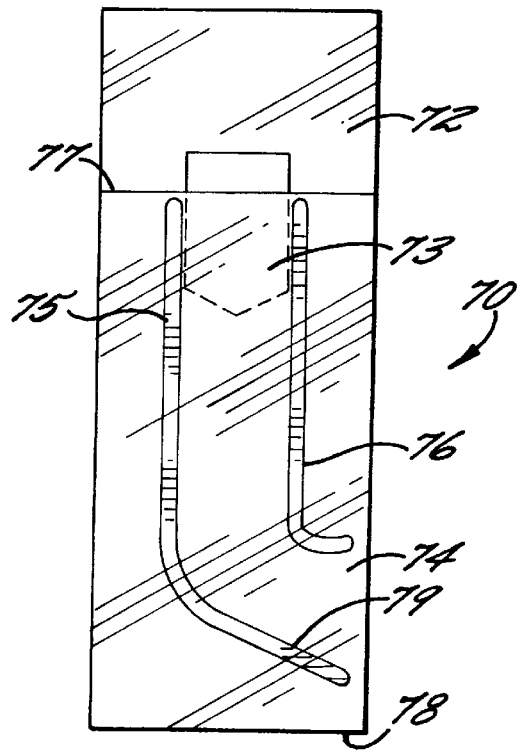
FIG. 8 shows another embodiment of the self-closing valve of the present invention having air flow which is directed through one side of the valve.
Figure 9:
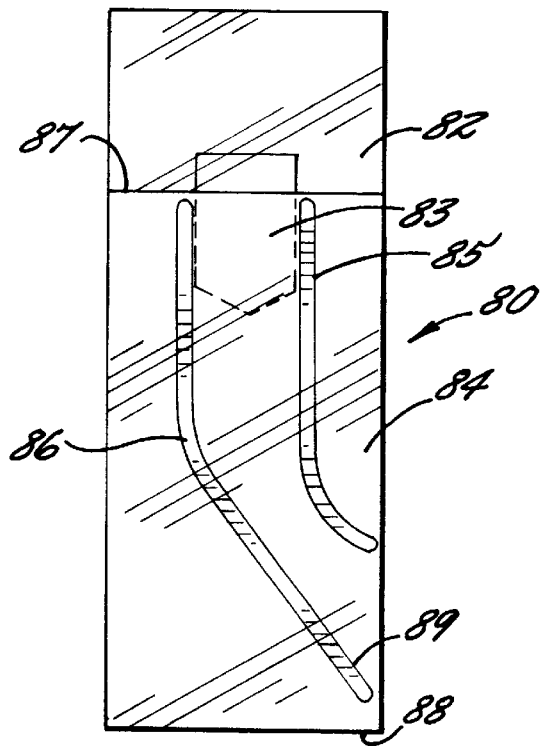
FIG. 9 shows another embodiment of the self-closing valve of the present invention having air flow which is directed through one side of the valve.

Referring now to FIG. 7, there is shown another embodiment of the self-closing valve 60. This embodiment, as well as the embodiments of FIGS. 8–9, are characterized by the air passageway being formed so that the air outlet end 68 has only one air outlet located at one of the longitudinal edges of the valve. The valve 60 includes first and second sheets of thermoplastic material 62, 64 in face-to-face relationship with each other. The sheets forming the valve may be of the same thickness or of different thickness. The first sheet 62 may be longer than the front sheet 64. The first and second sheets 62, 64 are secured together at weld lines 65, 66 along a portion of the longitudinal edges of the sheets and define a passageway therebetween. The weld lines in the embodiment of FIG. 7 form a passageway extending along the longitudinal edges from the air inlet end to near the air outlet end and form a generally "L"-shape or "J"-shape at one of the longitudinal edges. A sufficient unwelded space along the longitudinal edge is provided for the incoming air to pass therethrough. In the embodiment of FIG. 7, the welds 65, 66 along the longitudinal edges taper slightly inwardly for a portion of their length somewhat narrowing the passageway width causing non-linear air flow. The air passageway has an air inlet end 67 and an air outlet end 68. The space between the ends of weld lines 65, 66 forms air outlet directing the incoming air into the cushion chamber. A non-sealing barrier 63 may be provided at the air inlet end to prevent welding the valve shut when sealing the valve to a cushion wall.

Another embodiment of the single side nonlinear air flow valve is shown in FIG. 8 wherein there is provided a self-closing valve 70 of the present invention which includes first and second sheets of thermoplastic material 72, 74 in face-to-face relationship with each other. The valve 70 may be welded to cushion walls or between the peripheral edges of the walls. Sheet 72 is longer than sheet 74 so that the valve structure may be welded to a wall portion rather than at an edge. Sheets 72, 74 are secured together at weld lines 75, 76 along a portion of the longitudinal edges of the sheets and define a passageway therebetween extending along the longitudinal edges from an air inlet end 77 to near the air outlet end 78 where they terminate in a single outwardly hooking end. A sufficient unwelded space along the longitudinal edge is provided for the incoming air to pass therethrough. As shown weld line 75 is angled to deflect the air through a longitudinal edge of said valve. A portion of weld line 75 blocks the air outlet end 78. The spaces between weld lines 75, 76 form the air outlet directing the incoming air into the cushion chamber. A non-sealing barrier 73 may be provided at the air inlet end.

In a third embodiment of the single side self-closing valve of the present invention, shown in FIG. 6, there is provided valve 80 of the present invention which includes first and second sheets 82, 84 of thermoplastic material in face-to-face relationship with each other. Sheet 82 may be longer than sheet 84 so that the valve structure may be welded to a wall portion rather than at an edge. The sheets are secured together at weld lines 85, 86 along a portion of their longitudinal edges and define a passageway therebetween. The weld lines forming the passageway extend along the longitudinal edges from an air inlet end 87 to near the air outlet end 88 where they terminate in outwardly extending ends at one longitudinal side of the valve. As shown, weld line 86 angles transversely across the outlet end 88 forming non-linear air flow through the passageway. A sufficient unwelded space along the longitudinal edge which weld lines 85, 86 terminate is provided for the incoming air to pass therethrough. A non-sealing barrier 83 may be provided at the air inlet end.

The term "self-closing" is intended to mean a device which allows the passage of substances, namely, air, through it in one direction without any return of any substantial amount of air through the valve. The valve designs of the present invention relieve stress on the valve structure. It has been found that using the valve structures of the present invention one sheet of the two thermoplastic sheets forming the valve may be thinner than the other.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An inflatable package self-closing valve structure consisting of:

a first sheet of thermoplastic material and a second sheet of thermoplastic material in face-to-face relationship with each other, one of said sheets having a portion extending longer than said other sheet;

said first and second sheets being secured together along a portion of the longitudinal edges of said sheets defining a passageway therebetween and defining an air inlet end and an air outlet end, the extended portion of said longer sheet being located at the inlet end so that the valve structure may be welded to a wall portion of said inflatable package and so that an inflating nozzle may be easily inserted; and said air outlet end having at least one air outlet located at one of the longitudinal edges of the valve and directing at least some of the incoming air through said longitudinal edge near the outlet end of said valve, the first and second sheets are completely sealed together at the outlet end which is located opposite the inlet end.

2. The self-closing valve according to claim 1 wherein said at least one air outlet is a pair of air outlets with one of said air outlets being located at each of said longitudinal edges.

3. The self-closing valve according to claim 2 wherein said air outlets are formed by an air deflector blocking the end of the outlet.

4. The self-closing valve according to claim 2 wherein said air outlets are formed by a generally U-shaped air deflector blocking the end of the outlet.

5. The self-closing valve according to claim 2 wherein said air outlets are formed by a generally V-shaped air deflector blocking the end of the outlet.

* * * * *